United States Patent
Nakanishi

(10) Patent No.: US 8,041,397 B2
(45) Date of Patent: Oct. 18, 2011

(54) MOBILE COMMUNICATION TERMINAL APPARATUS AND RECORDING MEDIUM WHICH RECORDS DATA OPERATION PROCESS PROGRAM

(75) Inventor: Tomoaki Nakanishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1218 days.

(21) Appl. No.: 10/844,459

(22) Filed: May 13, 2004

(65) Prior Publication Data

US 2004/0229657 A1 Nov. 18, 2004

(30) Foreign Application Priority Data

May 14, 2003 (JP) ................................. 2003-136229

(51) Int. Cl.
*H04M 1/38* (2006.01)
(52) U.S. Cl. ........... 455/566; 345/179; 341/20; 715/863
(58) Field of Classification Search .................. 455/566, 455/455; 340/706; 341/20; 345/179
See application file for complete search history.

(56) References Cited

U.S. PATENT DOCUMENTS

| | | | | |
|---|---|---|---|---|
| 5,049,862 | A * | 9/1991 | Dao et al. ....................... | 345/179 |
| 5,530,947 | A * | 6/1996 | Takasaki et al. ............... | 345/619 |
| 5,625,354 | A * | 4/1997 | Lerman ........................... | 341/20 |
| 5,745,116 | A * | 4/1998 | Pisutha-Arnond ............ | 715/863 |
| 2001/0004269 | A1 * | 6/2001 | Shibata et al. ........... | 348/333.06 |
| 2002/0065069 | A1 | 5/2002 | Phillips | |
| 2002/0163511 | A1 * | 11/2002 | Sekendur ....................... | 345/179 |
| 2003/0013483 | A1 * | 1/2003 | Ausems et al. ............... | 455/556 |
| 2003/0022701 | A1 * | 1/2003 | Gupta ........................... | 455/566 |
| 2003/0064757 | A1 * | 4/2003 | Yamadera et al. ............. | 455/566 |
| 2003/0109286 | A1 * | 6/2003 | Hack et al. ..................... | 455/566 |
| 2004/0204126 | A1 * | 10/2004 | Reyes et al. ................... | 455/566 |
| 2007/0191070 | A1 * | 8/2007 | Rao ................................ | 455/566 |

FOREIGN PATENT DOCUMENTS

| | | | |
|---|---|---|---|
| JP | 6-242885 | A | 9/1994 |
| JP | 6-324798 | A | 11/1994 |
| JP | 7-7592 | A | 1/1995 |
| JP | 7-44311 | A | 2/1995 |
| JP | 10-105324 | A | 4/1998 |
| JP | 10-105325 | A | 4/1998 |
| JP | 11-25148 | A | 1/1999 |
| JP | 2002-094629 | A | 3/2002 |
| JP | 2002-304340 | A | 10/2002 |
| JP | 2002-368842 | A | 12/2002 |

* cited by examiner

Primary Examiner — Charles Shedrick
(74) Attorney, Agent, or Firm — Sughrue Mion, PLLC

(57) ABSTRACT

A mobile communication terminal apparatus having a panel used for a predetermined operation and image display and storage unit for recording various pieces of information includes a macro information setting unit, line model setting unit, macro information read unit, and macro processing unit. The macro information setting unit sets macro information which performs a series of operations. The line model setting unit sets linear line model information input from the panel for the macro information set by the macro information setting unit, and records the set line model information and macro information in the storage unit in correspondence with each other. The macro information read unit reads out, from the storage unit, macro information corresponding to line model information input from the panel. The macro processing unit executes a series of operations of the macro information read out by the macro information read unit. A recording medium which records a data operation process program is also disclosed.

9 Claims, 17 Drawing Sheets

|                           |                           |
| ------------------------- | ------------------------- |
| PHOTOGRAPH OF FRIEND B-1  | PHOTOGRAPH OF FRIEND B-2  |
| PHOTOGRAPH OF FRIEND B-3  | PHOTOGRAPH OF FRIEND B-4  |

GRAPHIC DATA B

FIG. 6B

|                           |                           |
| ------------------------- | ------------------------- |
| PHOTOGRAPH OF FRIEND A-1  | PHOTOGRAPH OF FRIEND A-2  |
| PHOTOGRAPH OF FRIEND A-3  | PHOTOGRAPH OF FRIEND A-4  |

GRAPHIC DATA A

FIG. 6A

MOBILE COMMUNICATION TERMINAL APPARATUS AND RECORDING MEDIUM WHICH RECORDS DATA OPERATION PROCESS PROGRAM

BACKGROUND OF THE INVENTION

The present invention relates to a mobile communication terminal apparatus and a recording medium which records a data operation process program and, more particularly, to a mobile communication terminal apparatus which implements by a simple operation a predetermined process operation that has been realized by a plurality of operations, and a recording medium which records a data operation process program.

In recent cell phones, input operation is frequently done using the operation keys of the cell phones along with an increase of various functions such as an electronic mail send/receive function and browser function. For example, an address display window is displayed by operating predetermined operation keys several times from a standby state in order to input a telephone number.

Recently, compact, multifunctional cell phones have rapidly been developed. For example, to downsize a cell phone, the screen size of the display of the cell phone and the number of operation keys are reduced. To reduce the number of operation keys, a plurality of functions must be assigned to operation keys. A multifunctional cell phone complicates the operation menu of the cell phone and sacrifices the user interface.

In this situation, there is proposed a cell phone disclosed in Japanese Patent Laid-Open No. 2002-94629. The conventional cell phone is a foldable cell phone in which upper and lower cases are pivotally coupled. The display screens are formed on almost the entire surfaces of the upper and lower cases, respectively, and can display an image of a larger size. This also allows setting a larger number of touch type operation buttons and implementing multiple functions.

However, the above-mentioned conventional cell phone shifts to a predetermined function window by a plurality of operations using touch type operation keys. In many cases, a series of operations for shift to a desired function window become complicated.

The future aging society requires a more easy-to-understand user interface.

SUMMARY OF THE INVENTION

The present invention has been made to overcome the conventional drawbacks, and has as its object to provide a mobile communication terminal apparatus which implements a user-friendly operation method, and a recording medium which records a data operation process program.

To achieve the above object, as a mobile communication terminal apparatus according to the present invention, there is provided a mobile communication terminal apparatus having a panel used for a predetermined operation and image display and storage means for recording various pieces of information, comprising macro information setting means for setting macro information which performs a series of operations, line model setting means for setting linear line model information input from the panel for the macro information set by the macro information setting means, and recording the set line model information and the macro information in the storage means in correspondence with each other, macro information read means for reading out, from the storage means, macro information corresponding to line model information input from the panel, and macro processing means for executing a series of operations of the macro information read out by the macro information read means.

As a recording medium which records a data operation process program according to the present invention, there is provided a recording medium which records a program that causes a controller of a mobile communication terminal apparatus having a panel used for a predetermined operation and image display and storage means for recording various pieces of information to execute a macro information setting process of setting macro information which performs a series of operations, a line model setting process of setting linear line model information input from the panel for the macro information set in the macro information setting process, and recording the set line model information and the macro information in the storage means in correspondence with each other, a macro information read process of reading out, from the storage means, macro information corresponding to line model information input from the panel, and a macro process of executing a series of operations of the macro information read out in the macro information read process.

BRIEF DESCRIPTION OF THE DRAWINGS

FIGS. 6A and 6B are views showing graphic data used for registration in the macro process;

DESCRIPTION OF THE PREFERRED EMBODIMENTS (Feature of Present Invention)

The feature of the present invention will be explained with reference to FIGS. 1 and 2.

In a mobile communication terminal apparatus according to the present invention, macro information for executing a series of process operations is set using liquid crystal units 1 and 2. Linear line model information (line model shape information and line model position information) input from the liquid crystal units 1 and 2 is added to the macro information. The line model information and macro information are registered in a flash ROM 12 in correspondence with each other. Line model information registered in the flash ROM 12 is input from the liquid crystal units 1 and 2. In response to this, macro information corresponding to the input line model information is called from the flash ROM 12 to perform a series of process operations. Hence, a plurality of functions can be successively executed by a simple input pattern.

First Embodiment

A cell phone according to the first embodiment of the present invention will be described.

The structure of the cell phone according to the first embodiment will be explained with reference to FIG. 1.

Figure 1:
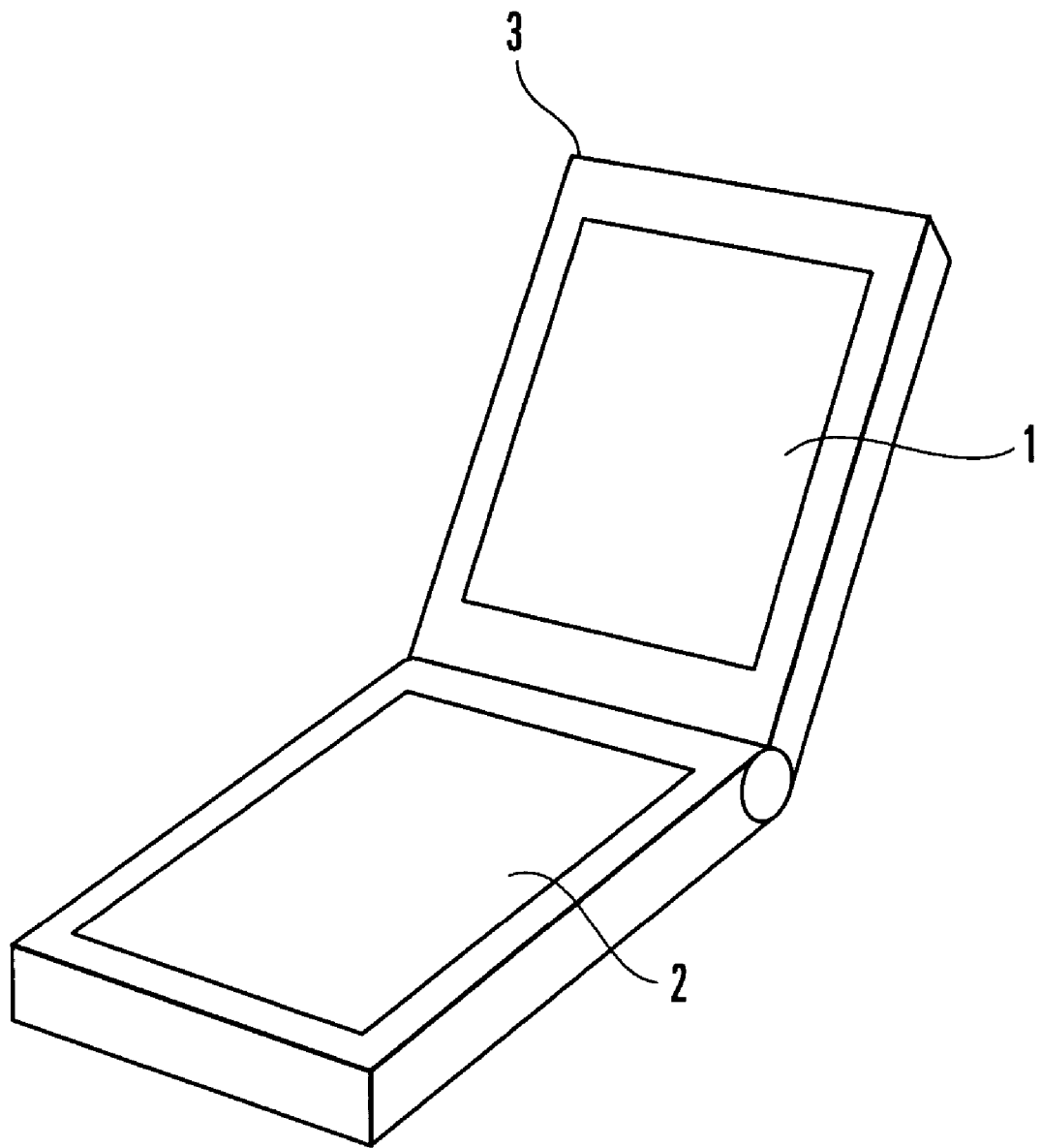
FIG. 1 is a view showing an example of the structure of a mobile communication terminal apparatus in the first embodiment according to the present invention.

The cell phone shown in FIG. 1 is a foldable cell phone having two liquid crystal units 1 and 2. The foldable structure protects the two liquid crystal units 1 and 2. The cell phone comprises a data input stylus 3 and an antenna (not shown).

The liquid crystal unit 1 mainly provides a normal window display, whereas the liquid crystal unit 2 provides a window display associated with data input. The liquid crystal units 1 and 2 are not different in window display performance, and can be exchanged for only the display and operation functions. In other words, the liquid crystal units 1 and 2 can achieve both the display and operation functions.

The internal structure of the cell phone shown in FIG. 1 will be explained with reference to FIG. 2.

Figure 2:
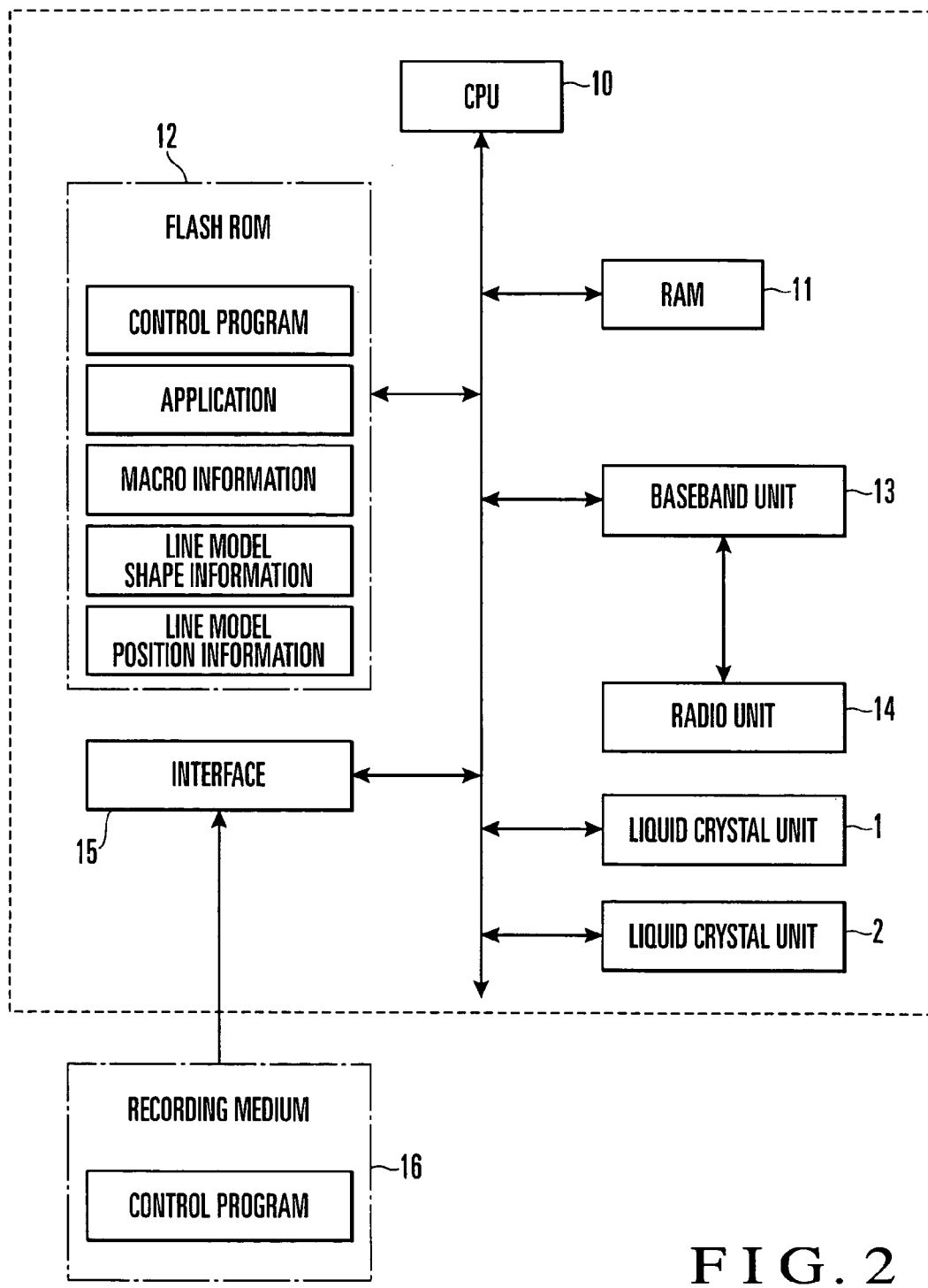
FIG. 2 is a block diagram showing the internal arrangement of the mobile communication terminal apparatus.

As shown in FIG. 2, the cell phone comprises, in addition to the liquid crystal units 1 and 2, a CPU (controller) 10 which controls the operation of each unit of the cell phone, a RAM (first storage) 11 serving as a work area, a flash ROM (second storage) 12 which records various pieces of information, a baseband unit 13 which converts an information signal into a signal to be transmitted to a transmission channel, a radio unit 14 for the cell phone, and an interface 15 to which a recording medium 16 is connected.

The flash ROM 12 records a control program (data operation process program), applications, and macro information and line model information which are successively executed.

As line model information, line model shape information and line model position information (also containing line model size information) are registered in the flash ROM 12 in order to perform a plurality of different processes by the same line model. The line model shape information is linear line model information which is input from the liquid crystal units 1 and 2 with the stylus 3, finger, or the like. The line model position information represents a position on the liquid crystal units 1 and 2 at which the linear line model is input.

The line model may permit registration of only one corner (one line segment input by a series of operations of touching the pen tip to the liquid crystal units 1 and 2, moving the pen tip to draw a line, and moving the pen tip apart from the liquid crystal units 1 and 2), and registration of a plurality of corners.

The control program is provided in a state in which it is recorded on the recording medium 16 such as an optical disk, magnetic disk, or semiconductor memory. The recording medium 16 is connected to the interface 15, and the CPU 10 reads out the control program written on the recording medium 16 and stores it in the flash ROM 12.

Functions implemented by the CPU 10 will be described with reference to FIGS. 3A and 3B.

Figure 3A:
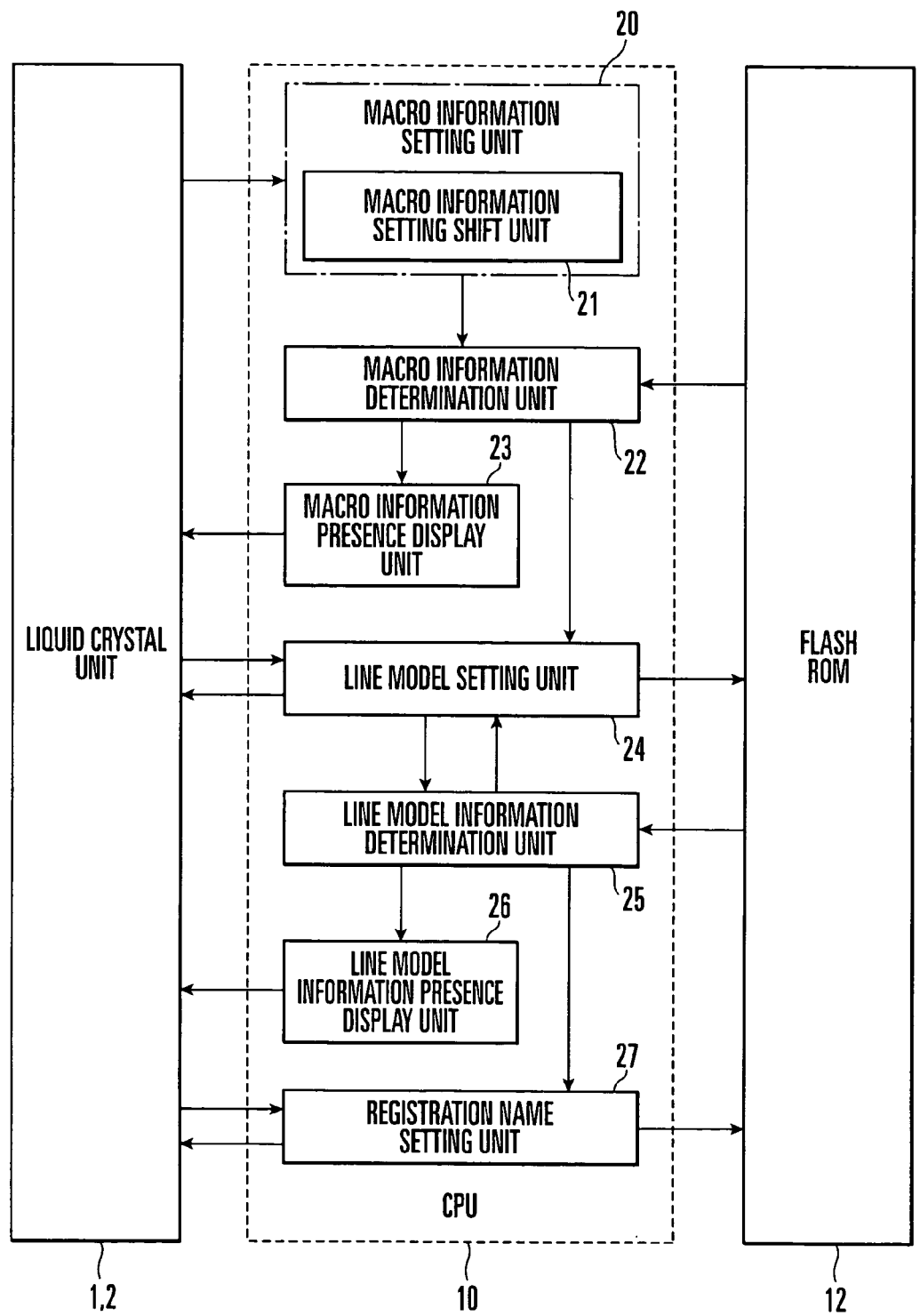
FIGS. 3A and 3B are block diagrams showing functional units implemented by a CPU.
Figure 3B:
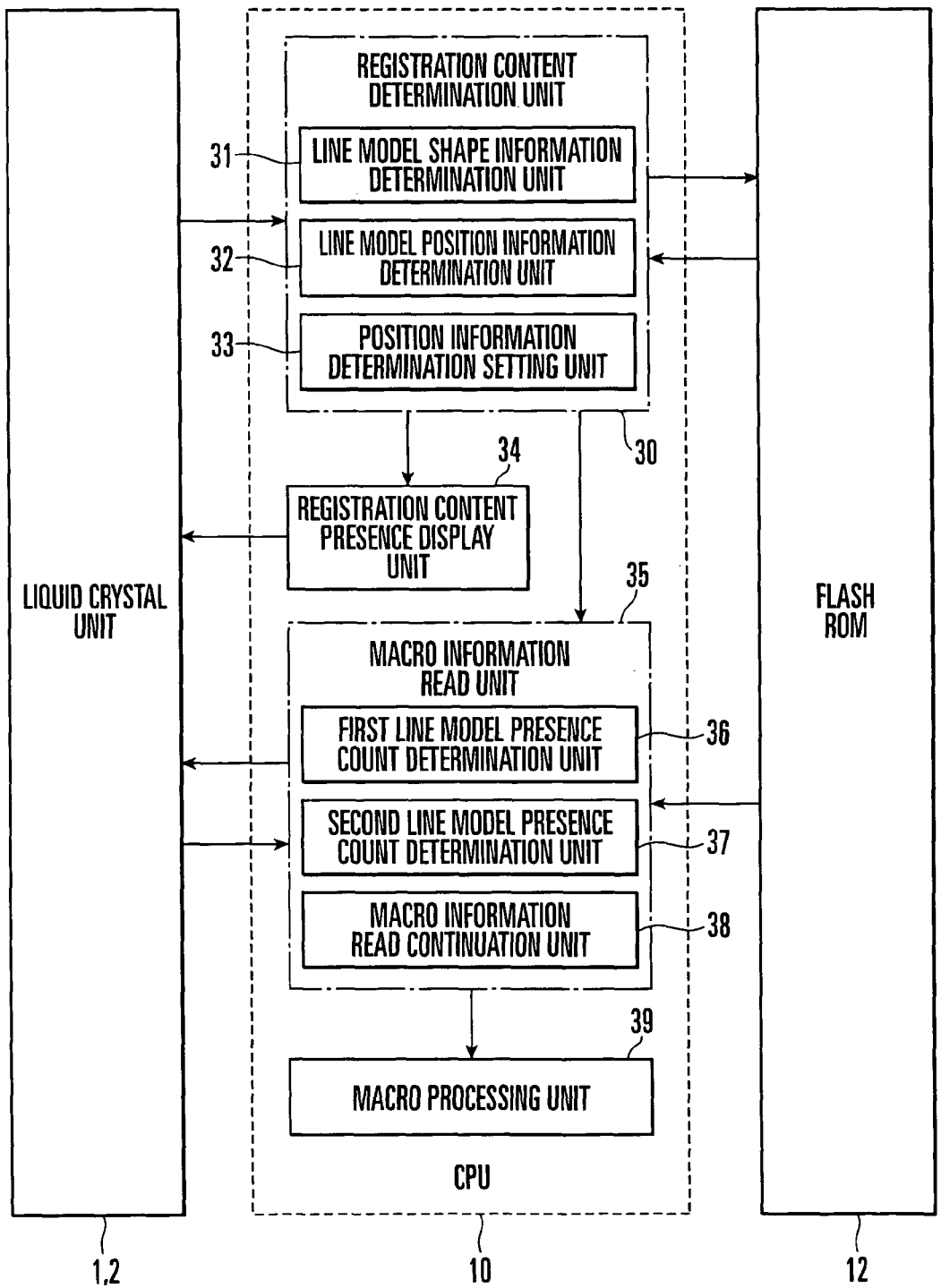

The CPU 10 executes the control program stored in the flash ROM 12 to implement a macro information setting unit 20, macro information determination unit 22, macro information presence display unit 23, line model setting unit 24, line model information determination unit 25, line model information presence display unit 26, and registration name setting unit 27 which are illustrated in FIG. 3A, and a registration content determination unit 30, registration content presence display unit 34, macro information read unit 35, and macro processing unit 39 which are illustrated in FIG. 3B.

The macro information setting unit 20 temporarily sets macro information input from the liquid crystal units 1 and 2 in the RAM 11. The macro information setting unit 20 comprises a macro information setting shift unit 21 capable of setting macro information in accordance with a predetermined operation on the liquid crystal units 1 and 2.

The macro information determination unit 22 determines whether macro information set by the macro information setting unit 20 has already been registered in the flash ROM 12.

The macro information presence display unit 23 displays on the liquid crystal units 1 and 2 a message that macro information has already been registered when the macro information determination unit 22 determines that the macro information has already been registered in the flash ROM 12.

The line model setting unit 24 sets line model information input from the liquid crystal units 1 and 2 for macro information set by the macro information setting unit 20, and registers the set line model information and macro information in the flash ROM 12 in correspondence with each other. When the macro information determination unit 22 determines that no macro information has been registered in the flash ROM 12, line model information can be input from the liquid crystal units 1 and 2.

The line model information determination unit 25 determines whether line model information set by the line model setting unit 24 has already been registered in the flash ROM 12. When the line model information determination unit 25 determines that no line model information has been registered, the line model setting unit 24 registers line model information and macro information.

The line model information presence display unit 26 displays on the liquid crystal units 1 and 2 a message that line model information has been registered when the line model information determination unit 25 determines that line model information has been registered.

The registration name setting unit 27 sets, for line model information set for macro information, a registration name for identifying the line model information.

The registration content determination unit 30 determines whether line model information input from the liquid crystal units 1 and 2 has been registered in the flash ROM 12. The registration content determination unit 30 comprises a line model shape information determination unit 31 which determines whether shape information of a line model input from the liquid crystal units 1 and 2 has been registered in the flash ROM 12, a line model position information determination unit 32 which determines whether position information of the line model has been registered in the flash ROM 12, and a position information determination setting unit 33 which sets whether to perform line model position information determination.

The registration content presence display unit 34 displays on the liquid crystal units 1 and 2 a message that no line model information has been registered when the registration content determination unit 30 determines that no line model information has been registered in the flash ROM 12.

The macro information read unit 35 reads out macro information corresponding to line model information from the flash ROM 12 when the registration content determination unit 30 determines that the line model information input from the liquid crystal units 1 and 2 has been registered in the flash ROM 12. More specifically, the macro information read unit 35 reads out macro information corresponding to shape information and position information of a line model from the flash ROM 12 when the position information determination setting unit 33 sets execution of line model position information determination, the line model shape information determination unit 31 determines that the line model shape information has been registered in the flash ROM 12, and the line model position information determination unit 32 determines that the line model position information has been registered in the flash ROM 12. The macro information read unit 35 reads out macro information corresponding to line model shape information from the flash ROM 12 when the position information determination setting unit 33 sets no execution of line model position information determination and the line model shape information determination unit 31 determines that the line model shape information has been registered in the flash ROM 12.

The macro information read unit 35 comprises a first line model presence count determination unit 36 which determines whether pieces of line model information input from the liquid crystal units 1 and 2 exist in the flash ROM 12. When the first line model presence count determination unit 36 determines that pieces of line model information exist, the macro information read unit 35 displays on the liquid crystal units 1 and 2 a message that the pieces of line model information exist, and reads out from the flash ROM 12 macro information corresponding to line model information designated from the liquid crystal units 1 and 2. When the first line model presence count determination unit 36 determines that single line model information exists, the macro information read unit 35 reads out macro information corresponding to the single line model information from the flash ROM 12.

The macro information read unit 35 also comprises a second line model presence count determination unit 37 which determines whether pieces of line model information having the same shape information and same position information of a line model input from the liquid crystal units 1 and 2 exist in the flash ROM 12. When the second line model presence count determination unit 37 determines that pieces of line model information having the same shape information and same position information of a line model exist in the flash ROM 12, the macro information read unit 35 displays on the liquid crystal units 1 and 2 a message that the pieces of line model information exist, and reads out from the flash ROM 12 macro information corresponding to line model information designated from the liquid crystal units 1 and 2. When the second line model presence count determination unit 37 determines that single line model information having the same shape information and same position information of a line model exists, the macro information read unit 35 reads out macro information corresponding to the determined single line model information from the flash ROM 12.

The macro information read unit 35 further comprises a macro information read continuation unit 38 which continuously reads out from the flash ROM 12 macro information corresponding to line model information input from the liquid crystal units 1 and 2.

The macro processing unit 39 executes a series of operations of macro information read out by the macro information read unit 35.

Figure 4:
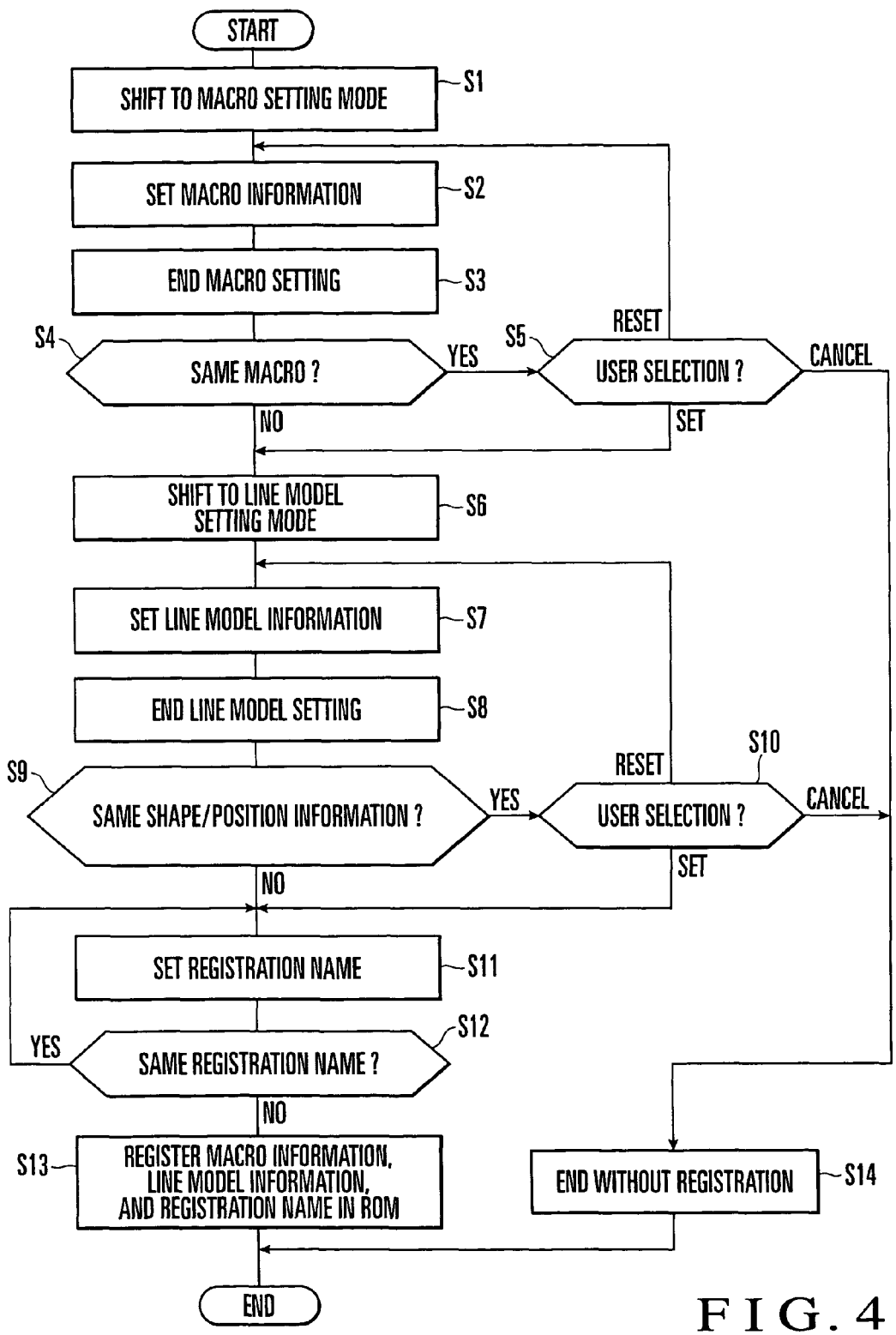
FIG. 4 is a flowchart showing a line model registration method by a macro process in the mobile communication terminal apparatus.
Figure 5:
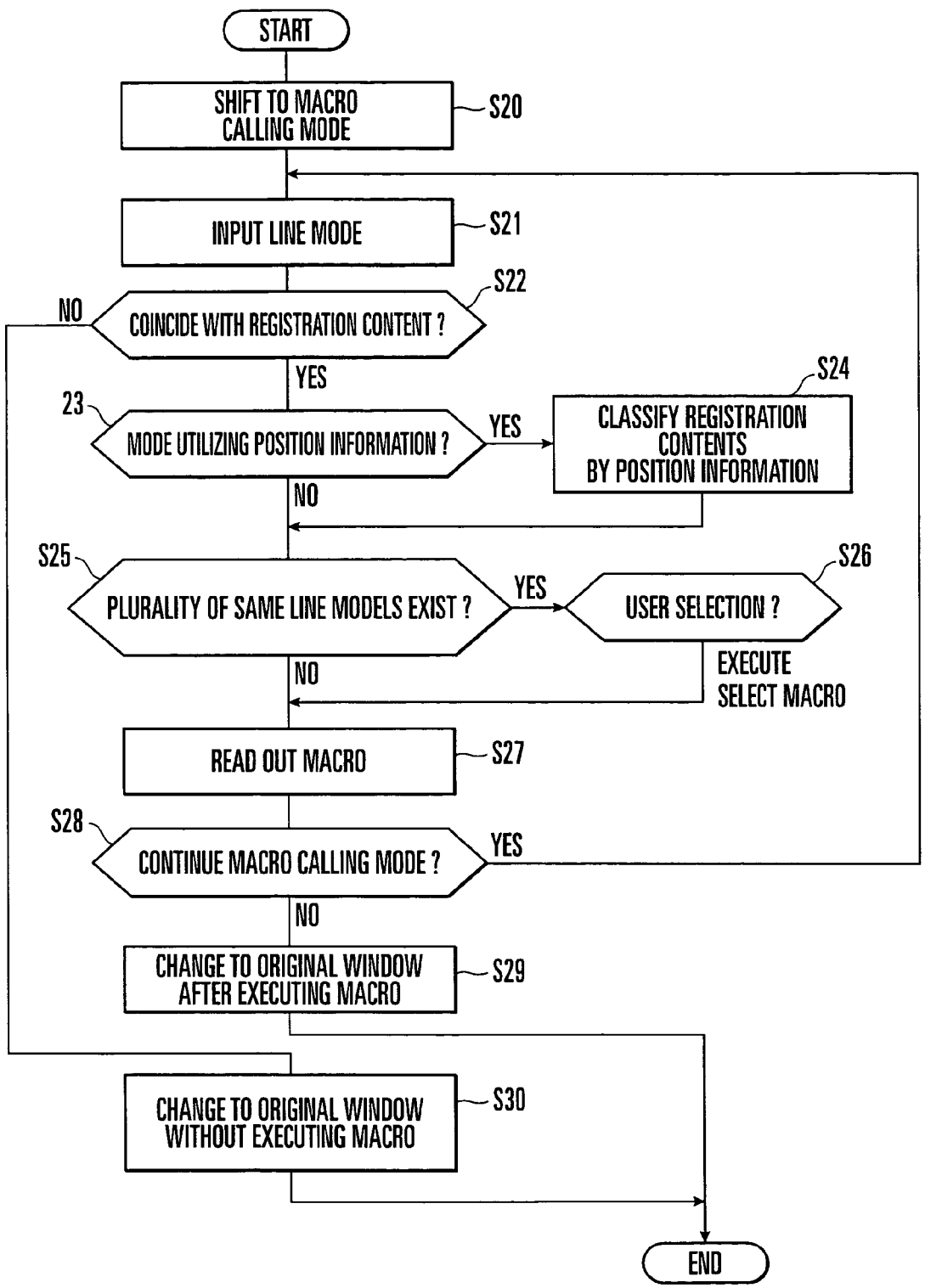
FIG. 5 is a flowchart showing a line model utilization method by the macro process in the mobile communication terminal apparatus.

Process operations in the cell phone having the above arrangement will be described with reference to FIGS. 4 and 5. FIG. 4 shows a line model registration method by a macro process. FIG. 5 shows a line model utilization method by the macro process.

(Line Model Registration Method by Macro Process)

The line model registration method by the macro process will be explained with reference to FIG. 4.

A predetermined operation is done on the liquid crystal unit 2 of the cell phone, and the macro information setting shift unit 21 shifts the normal mode to a macro setting mode (step S1). An operation method of shifting to the macro setting mode may adopt various means such as a hard key or software key. Considering avoidance of any operation error, according to the first embodiment, the normal mode shifts to the macro setting mode by touching the upper portion of the liquid crystal unit 2 from right to left with the stylus or finger, as shown in FIG. 7A.

The cell phone function shifts from the normal mode to the macro setting mode by a predetermined operation which triggers shift to the macro setting mode. Along with shift to the macro setting mode, the color of a keyboard displayed on the liquid crystal unit 2 can be changed, as shown in FIG. 7B, or a character string (macro setting mode) representing that macro setting is in progress can also be overlapped and displayed on the liquid crystal unit 1, as shown in FIG. 7A. The user can be notified that the normal mode has shifted to the macro setting mode. The operation in the macro setting mode is basically the same as normal operation except that only a registration process of a scheduler, telephone book, or the like and an origination/on-hook process are different.

The macro information setting unit 20 sets macro information (step S2). More specifically, macro information input from the liquid crystal units 1 and 2 is temporarily recorded in the RAM 11.

A macro information input process is done in the windows (operations) of the liquid crystal units 1 and 2. During setting of macro information, no setting is reflected in actual data recorded in the cell phone. Similarly, only the window of the liquid crystal unit is changed in a data origination process, and no actual origination process is performed.

If the origination process is performed during setting of macro information, the windows of the liquid crystal units change from "during origination—during calling—during speech communication", and key inputs are executed in the respective windows so as to cope with pause operation or the like.

Figure 7C:
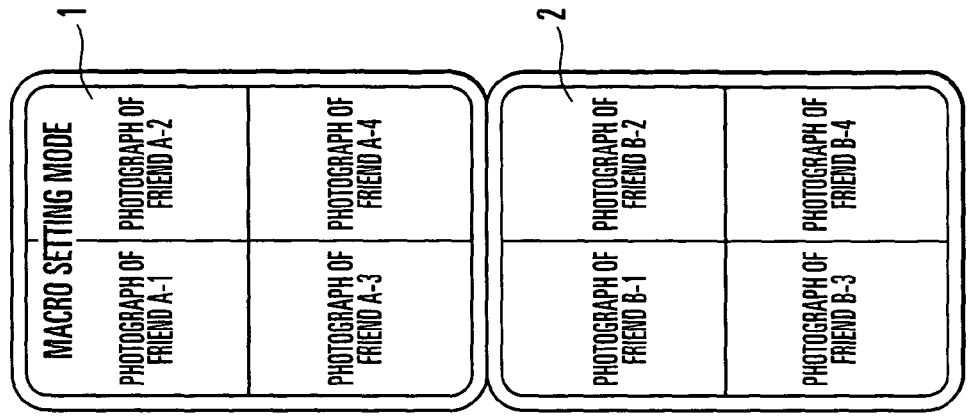
FIGS. 7A to 7H are views for explaining a process operation of registering in a cell phone a series of operations for displaying a call destination selection photograph.
Figure 7B:
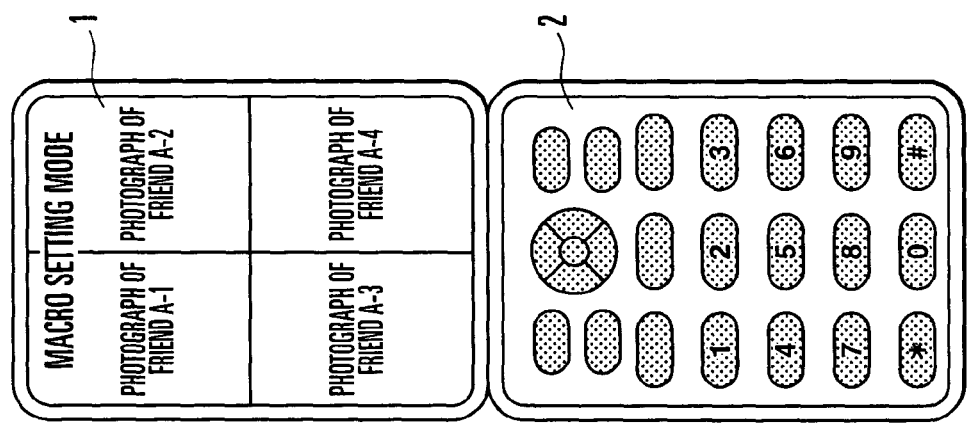
Figure 7A:
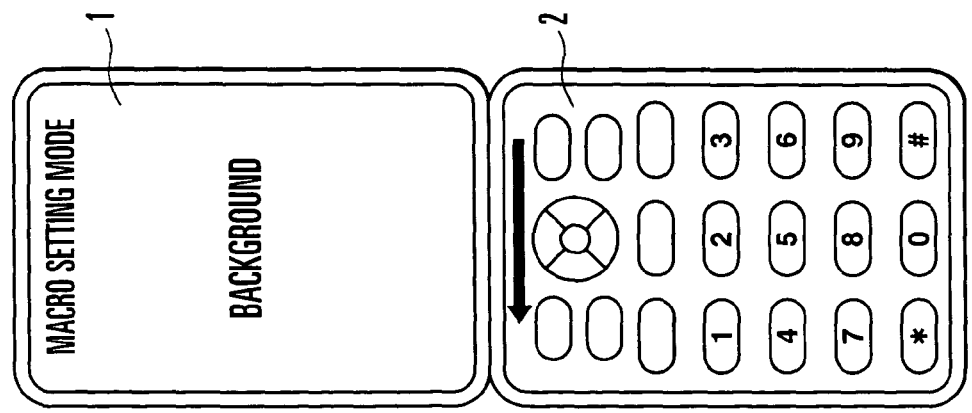
Figure 7F:
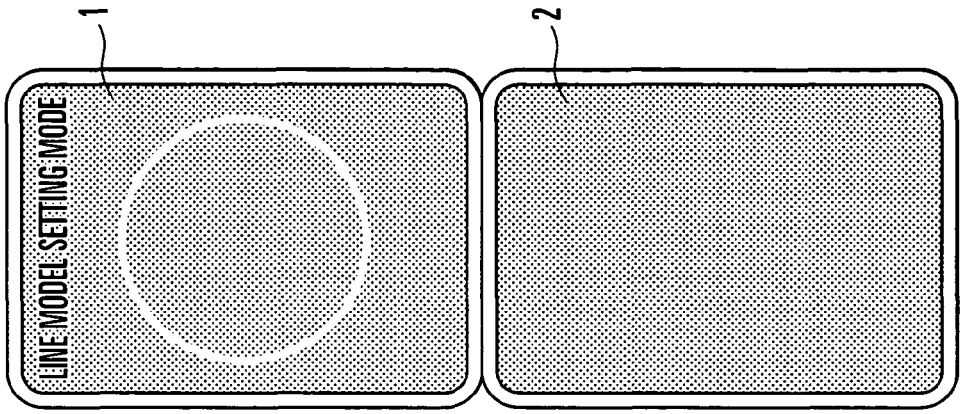

As an exceptional process in the use of a macro, a process of waiting for the next macro can be input after execution of the macro. In general, the window returns to an original one immediately after execution of a macro. This function enables executing another macro process while the window display of the liquid crystal unit or the like is temporarily switched. By drawing a line model on the liquid crystal unit, a macro calling process (to be described later) also becomes possible. Similar to the macro calling mode (to be described later), a command may be input by touching the upper portion of the liquid crystal unit 2 from left to right with the stylus (or finger), as shown in FIG. 7D.

Figure 7E:
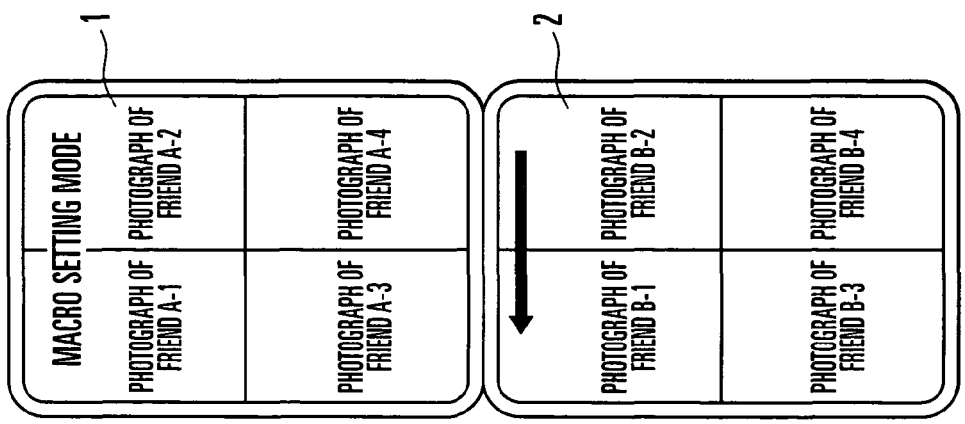
Figure 7D:
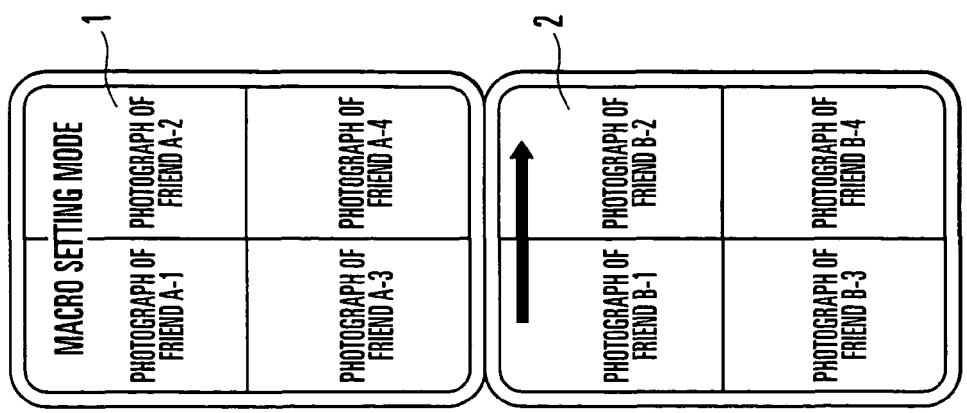

After a command is input, macro setting ends by touching again the upper portion of the window of the liquid crystal unit 2 from right to left, as shown in FIG. 7E (step S3).

After the end of macro setting, the macro information determination unit 22 determines whether macro information set in the macro setting mode has already been registered in the flash ROM 12 (step S4). If no macro information is determined to have been registered in the flash ROM 12 (NO in step S4), the mode changes to a line model setting mode (step S6).

If the macro information is determined to have been registered in the flash ROM 12 (YES in step S4), the macro information presence display unit 23 displays on the liquid crystal units 1 and 2 a pop-up message that the same macro information has already been registered in the flash ROM 12. The user selects from the liquid crystal units 1 and 2 one of an operation of setting line model information for the macro information ("set" in step S5), an operation of resetting the macro information ("reset" in step S5), and an operation of canceling the macro setting mode without setting any line model information for the macro information ("cancel" in step S5). A process corresponding to the selection is executed.

More specifically, if information selected by the user from the liquid crystal units 1 and 2 is determined to represent that line model information is set for the macro information ("set" in step S5), the mode shifts to the line model setting mode (step S6).

If the information selected by the user from the liquid crystal units 1 and 2 is determined to represent that macro information is reset ("reset" in step S5), the process returns to step S2 to set macro information again.

If the information selected by the user from the liquid crystal units 1 and 2 is determined to represent that the macro setting mode is canceled ("cancel" in step S5), a series of processes end without shifting to the line model setting mode and setting any line model information for the macro information (step S14).

In this manner, when set macro information is determined to exist in the flash ROM 12, the user can select one of setting of new line model information for the set macro information, cancellation of new line model information for the set macro information, and resetting of the macro information.

If the mode shifts to the line model setting mode (step S6), the line model setting unit 24 sets line model information (step S7). More specifically, line model information input from the liquid crystal units 1 and 2 is temporarily recorded in the RAM 11.

A line model information input window is displayed in a specific solid color on both the liquid crystal screens of the liquid crystal units 1 and 2. As shown in FIG. 7F, line model information is displayed on the liquid crystal unit at a position where the line model information has been input. At this time, registration of line model information becomes valid regardless of whether the line model information is input from the liquid crystal unit 1 or 2.

Line model information is input with the stylus (or finger). At this time, line model shape information and line model position information are set as the line model information. The line model position information contains line model size information.

In the case of permitting input of only one corner of line model information, when the stylus (or finger) moves apart from the liquid crystal units 1 and 2, input of line model information is determined to end, ending setting of line model information (step S8).

The line model information determination unit 25 determines whether the line model information set in the line model setting mode has already been registered in the flash ROM 12 (step S9). More specifically, the line model information determination unit 25 determines whether the line model shape information and position information set in the line model setting mode coincide with line model information registered in the flash ROM 12 (step S9). If the line model shape information and position information are determined not to coincide with the line model information (NO in step S9), the line model information determination unit 25 determines that no line model information has been registered in the flash ROM 12, and the mode shifts to registration name setting (step S11).

If the line model shape information and position information are determined to coincide with the line model information (YES in step S9), the line model information presence display unit 26 displays on the liquid crystal units 1 and 2 a pop-up message that the same line model information has already been registered in the flash ROM 12. The user selects from the liquid crystal units 1 and 2 one of an operation of setting the same line model information ("set" in step S10), an operation of resetting the line model information ("reset" in step S10), and an operation of canceling the line model setting mode without setting any line model information ("cancel" in step S10). A process corresponding to the selection is executed.

More specifically, if information selected by the user from the liquid crystal units 1 and 2 is determined to represent that line model information is set ("set" in step S10), the registration name setting unit 27 sets a registration name for identifying the line model information (step S11). For example, a registration name input from the liquid crystal units 1 and 2 is temporarily recorded in the RAM 11.

If the information selected by the user from the liquid crystal units 1 and 2 is determined to represent that line model information is reset ("reset" in step S10), the process returns to step S7 to set line model information again.

If the information selected by the user from the liquid crystal units 1 and 2 is determined to represent that the line model setting mode is canceled ("cancel" in step S10), a series of processes end without setting any line model information for the macro information (step S14).

In determination of step S9, only line model shape information can be determined.

Whether the registration name set in step S11 has already been registered in the flash ROM 12 is determined (step S12). If the same registration name is determined to have already been registered (YES in step S12), the process returns to step S11 again to reset a registration name and inhibit the same registration name. If no same registration name is determined to have been registered (NO in step S12), the registration name is set for the line model information set in the line model setting mode.

The line model setting unit 24 reads out the macro information, line model information, and registration name which are recorded in the RAM 11, and records them in the flash ROM 12 in correspondence with each other. Registration of the macro information, line model information, and registration name is completed (step S13), ending the macro setting mode.

The registration name is used to confirm line model information set for macro information by the user when the same macro information as that set in the macro setting mode is determined to have been registered in the flash ROM 12 (step S4). Also, the registration name is used to facilitate confirmation of information by the user by displaying the registration name in addition to macro information and line model information on the liquid crystal units 1 and 2 when it is determined in the macro setting mode and the macro calling mode (to be described later) that pieces of line model shape information coincide with each other though pieces of line model position information are different.

(Line Model Utilization Method by Macro Process)

A process operation utilizing a line model in the macro process will be explained with reference to FIG. 5.

A predetermined operation is done on the liquid crystal unit 2 of the cell phone, and the normal mode shifts to the macro calling mode (step S20).

Figure 9A:
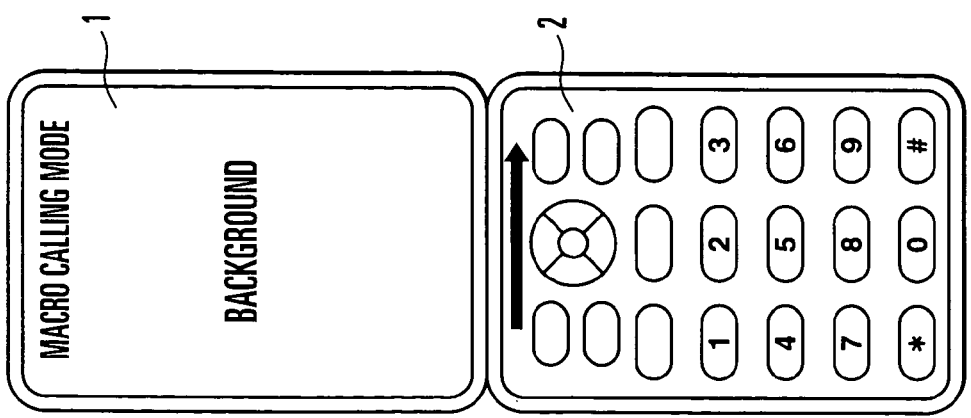
FIGS. 9A to 9E are views for explaining a process operation of executing a macro process and performing an origination process.

As an operation method of shifting to the macro calling mode, the upper portion of the liquid crystal unit 2 is touched from left to right with the stylus (or finger), as shown in FIG. 9A, in consideration of avoidance of any operation error.

By the above operation method, the cell phone shifts from the normal mode to the macro calling mode. Along with shift to the macro calling mode, a character string representing that the macro calling mode is set can be overlapped and displayed on the liquid crystal unit 1, as shown in FIG. 9A, thus notifying the user of the macro calling mode. In the macro calling mode, the liquid crystal unit 2 displays the window of the normal mode, and does not particularly change.

Figure 9B:
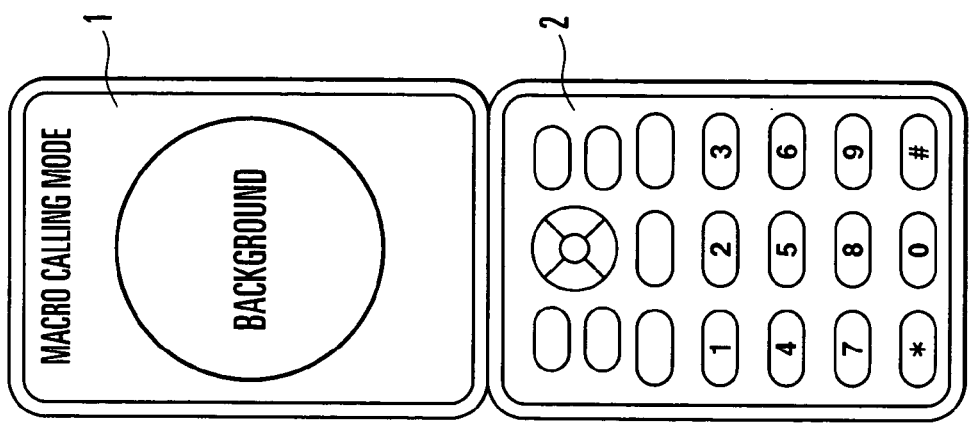

As shown in FIG. 9B, line model information is input from the liquid crystal unit 1 (step S21). In the case of permitting input of only one corner of line model information, when the stylus (or finger) moves apart from the liquid crystal unit 1, input of line model information is determined to be completed, similar to setting of line model information.

The line model shape information determination unit 31 of the registration content determination unit 30 determines whether there is a registration content in which line model shape information input from the liquid crystal unit 1 coincides with line model shape information registered in the flash ROM 12 (step S22). If a registration content in which the line model shape information coincides with the registered line model shape information is determined not to exist (NO in step S22), the registration content presence display unit 34 displays a pop-up message to this effect on the liquid crystal units 1 and 2. The process changes to the window of the original normal mode without executing any macro process (step S30).

If a registration content in which the line model shape information coincides with the line model shape information registered in the flash ROM 12 is determined to exist (YES in step S22), whether the current mode is a mode utilizing line model position information is determined (step S23). Note that the mode utilizing line model position information is a mode in which a comparison process with contents registered in the flash ROM 12 is performed using line model position information in addition to line model shape information input from the liquid crystal unit 1.

If the mode is determined in step S23 to be a mode utilizing no line model position information (NO in step S23), only pieces of line model shape information are compared in step S22, and the first line model presence count determination unit 36 of the macro information read unit 35 determines whether a plurality of line models with the same shape information exist, without any comparison of line model position information (step S25). If a plurality of line models having the same shape information are determined to exist (YES in step S25), all pieces of line model information having the same shape information are displayed on the liquid crystal units 1 and 2, and the process changes to a user selection operation standby state. The user then selects macro information to be executed from the liquid crystal units 1 and 2 (step S26).

If the mode is determined in step S23 to be a mode utilizing line model position information (YES in step S23), pieces of line model shape information are compared in step S22, and the line model position information determination unit 32 of the registration content determination unit 30 also compares pieces of line model position information (step S24). If line models having the same shape information exist but their pieces of position information do not coincide with each other, the registration content presence display unit 34 displays a pop-up message to this effect on the liquid crystal units 1 and 2.

When line models having the same shape information and same position information exist, the second line model presence count determination unit 37 of the macro information read unit 35 determines whether a plurality of line models having the same shape information and same position information exist (step S25). If a plurality of line models having the same shape information and same position information are determined to exist (YES in step S25), all pieces of line model information having the same shape information and same position information are displayed on the liquid crystal units 1 and 2, and the process changes to a user selection standby state. The user then selects macro information to be executed from the liquid crystal units 1 and 2 (step S26).

If single line model information is determined to exist (NO in step S25), the macro information read unit 35 reads out macro information corresponding to the single line model information from the flash ROM 12 (step S27). If the user selects macro information to be executed from the liquid crystal units 1 and 2 (step S26), the macro information read unit 35 reads out the selected macro information from the flash ROM 12 (step S27).

The macro information read continuation unit 38 of the macro information read unit 35 determines whether to continue the macro calling mode (step S28). A pop-up message which notifies the user whether to continue the macro calling mode can also be displayed on the liquid crystal units 1 and 2.

If the macro calling mode is determined to continue (YES in step S28), the process returns to step S21 again to input line model information. If the macro calling mode is determined not to continue (NO in step S28), the macro processing unit 39 executes a macro process, and then the process changes to the window of the original normal mode (step S29).

According to the first embodiment, in determination of whether to continue the macro calling mode, the macro calling mode is canceled by touching the upper portion of the liquid crystal unit 2 from right to left with the stylus (or finger). During execution of the macro process, a character string representing that a macro execution mode is set is overlapped and displayed on the liquid crystal unit 1, notifying the user that the macro execution mode is set. After the macro process ends, the character string displayed on the liquid crystal unit 1 is erased, and the macro execution mode changes to the normal mode. During execution of the macro process, all other user operations are inhibited to prevent any operation error.

As described above, the mode shifts to the macro calling mode, and line model information which has been registered in the flash ROM 12 is input from the liquid crystal units 1 and 2. Macro information corresponding to the input line model information can be read out from the flash ROM 12 to execute the macro process.

EXAMPLES

Examples of the process operation will be explained with reference to FIGS. 4 to 9E.

These examples will describe a process operation of using two line models, confirming the call destinations of eight persons by their photographs with a simple operation, and calling a home telephone or cell phone.

As a pre-setup, graphic data A and graphic data B each containing photographs of four persons are prepared, as shown in FIGS. 6A and 6B.

(Process Operation of Registering Series of Operations for Displaying Call Destination Selection Photograph)

A process operation of registering a series of operations for displaying a call destination selection photograph will be explained with reference to FIGS. 4 and 7A to 7H.

As the first process, as shown in FIG. 7A, the upper portion of the liquid crystal unit 2 is touched from right to left with the stylus (or finger), and the normal mode shifts to the macro setting mode (step S1).

As the second process, as shown in FIG. 7B, graphic data A shown in FIG. 6A is displayed on the liquid crystal unit 1.

As the third process, as shown in FIG. 7C, graphic data B shown in FIG. 6B is displayed on the liquid crystal unit 2.

As the fourth process, as shown in FIG. 7D, the upper portion of the liquid crystal unit 2 is touched from left to right with the stylus (or finger), shifting to a macro setting standby state.

As the fifth process, as shown in FIG. 7E, the upper portion of the liquid crystal unit 2 is touched from right to left with the stylus (or finger), shifting to the line model setting mode (step S6).

As the sixth process, as shown in FIG. 7F, a line model "○" is input from the liquid crystal unit 2 (step S7).

Figure 7G:
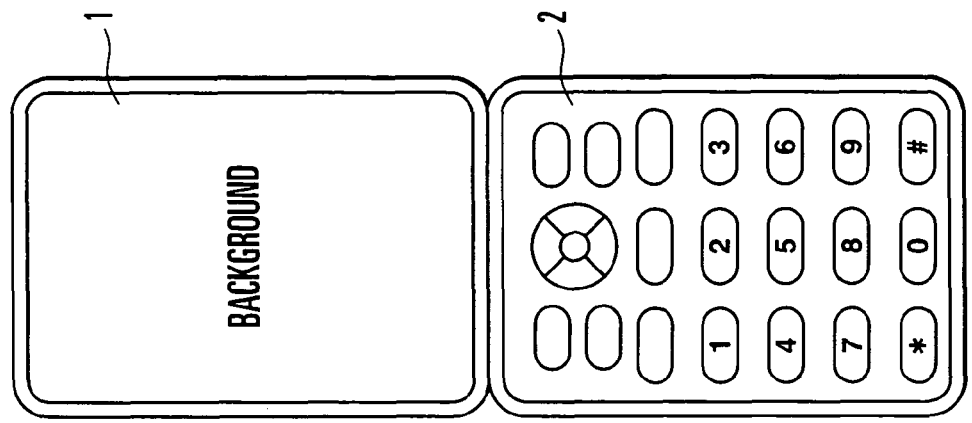

As the seventh process, as shown in FIG. 7G, a registration name is set (step S12).

Figure 7H:
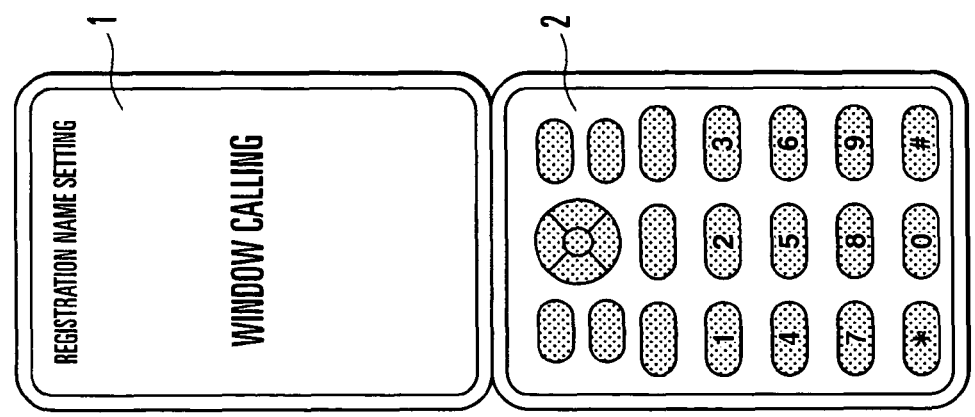

As the eighth process, as shown in FIG. 7H, the macro setting mode ends upon the completion of setting the registration name, changing to the normal mode (step S14).

(Process Operation of Registering Series of Operations for Registering Telephone Number (or Calling Telephone Number from Telephone Book Instead of Inputting Telephone Number)

A process operation of registering a series of operations for registering a telephone number will be explained with reference to FIGS. 4 and 8A to 8G.

Figure 8C:
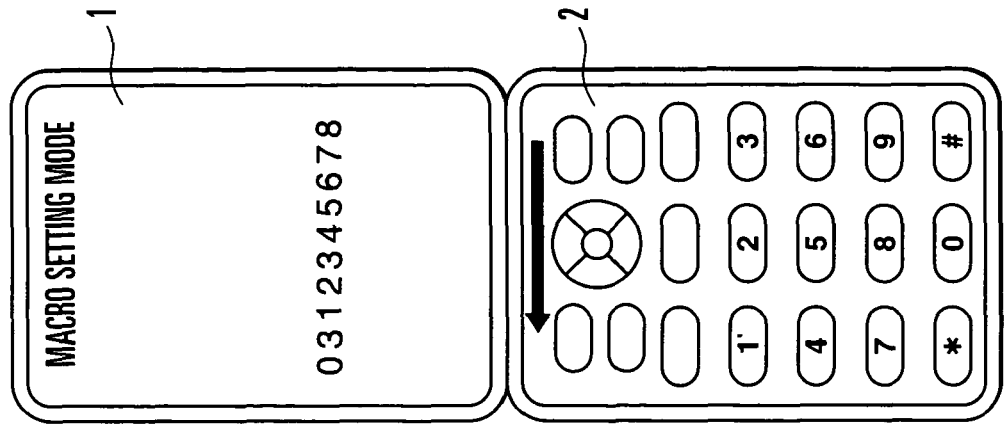
FIGS. 8A to 8G are views for explaining a process operation of registering in the cell phone a series of operations for registering a telephone number.
Figure 8B:
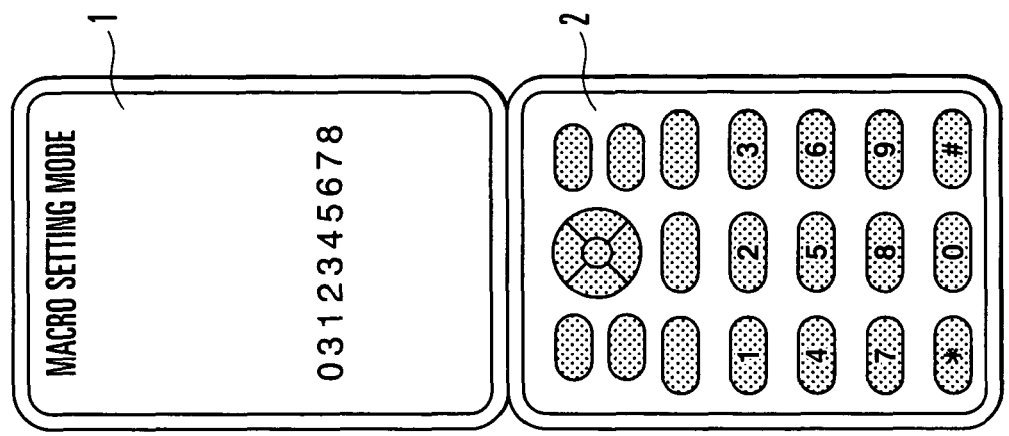
Figure 8A:
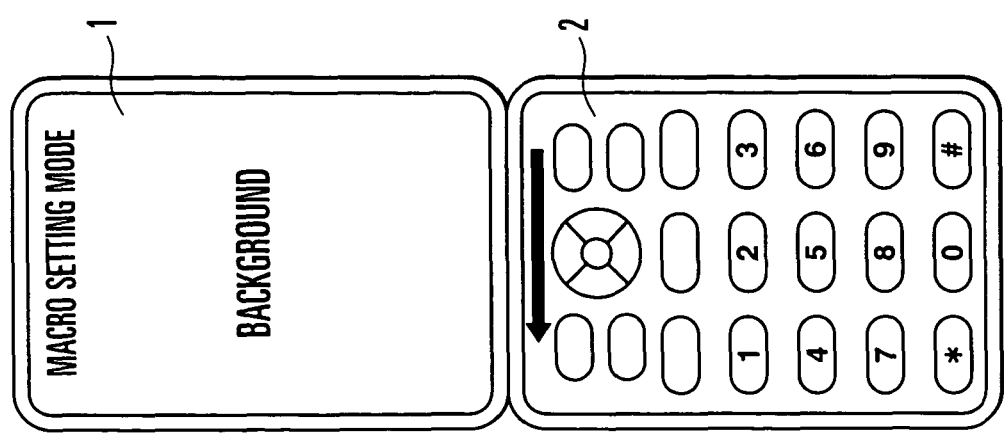

As the first process, as shown in FIG. 8A, the upper portion of the liquid crystal unit 2 is touched from right to left with the stylus (or finger), and the normal mode shifts to the macro setting mode (step S1).

As the second process, as shown in FIG. 8B, the home telephone number of friend A-1 is input, and origination operation is performed (step S2).

As the third process, as shown in FIG. 8C, the upper portion of the liquid crystal unit 2 is touched from right to left with the stylus (or finger), shifting to the line model setting mode (step S6).

Figure 8F:
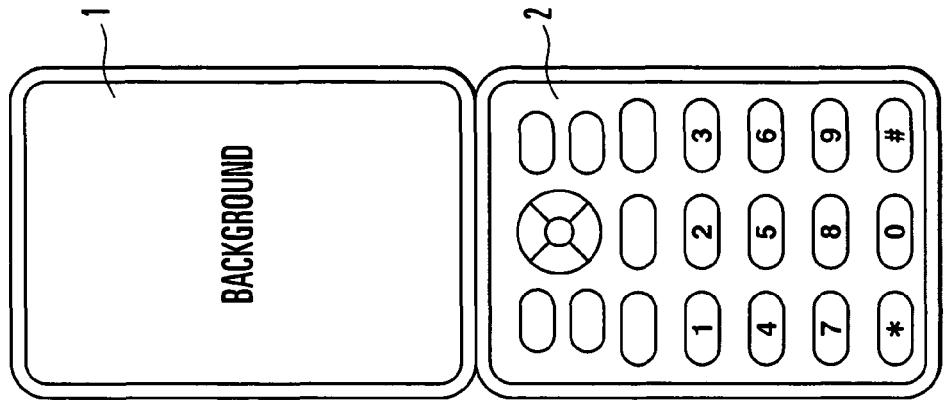
Figure 8E:
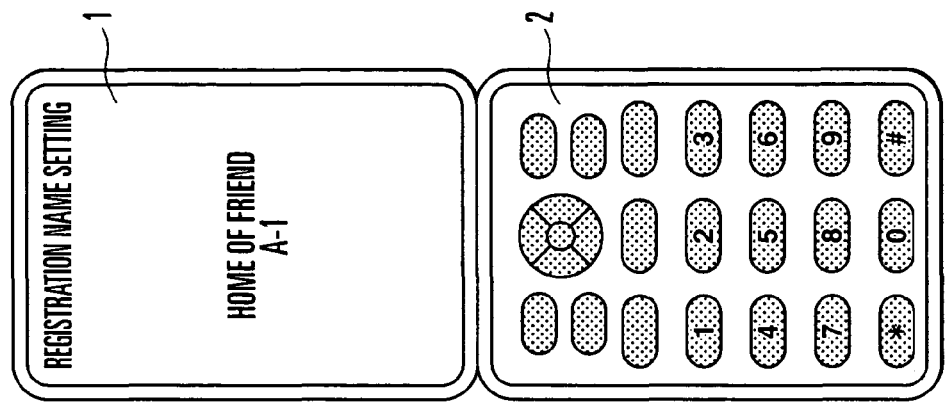
Figure 8D:
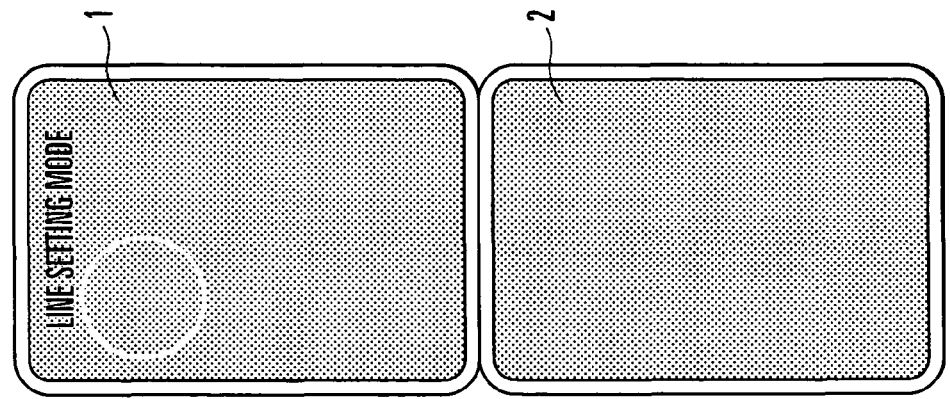

As the fourth process, as shown in FIG. 8D, a line model "○" is input at a position within area A-1 of the liquid crystal unit 1 (step S7).

As the fifth process, as shown in FIG. 8E, a registration name is set (step S12).

As the sixth process, as shown in FIG. 8F, the macro setting mode ends upon the completion of setting the registration name (step S14).

Figure 8G:
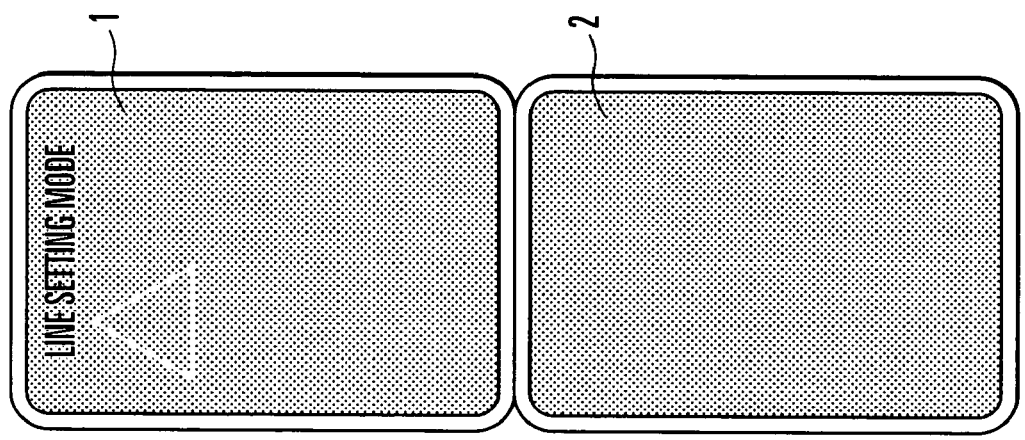

As the seventh process, the first to sixth processes are repeated to register a cell phone number. Note that a cell phone number is registered by inputting "Δ" as a line model input in the fourth process from the liquid crystal unit, as shown in FIG. 8G.

As the eighth process, the first to seventh processes are repeated to register the home telephone numbers and cell phone numbers of friends A-2 to B-4 shown in FIGS. 6A and 6B.

(Process Operation of Executing Macro Process and Performing Origination Process).

A process operation of executing a macro process and performing an origination process to the home telephone number of friend A-2 or the cell phone of fried B-3 will be described with reference to FIGS. 5 and 9A to 9E.

As the first process, as shown in FIG. 9A, the upper portion of the liquid crystal unit 2 is touched from left to right with the stylus (or finger), and the normal mode shifts to the macro calling mode (step S20).

As the second process, as shown in FIG. 9B, a line model "○" is input from the liquid crystal unit 1 (step S21). After graphic data A and graphic data B are displayed on the liquid crystal units 1 and 2, the macro calling mode continues.

Figure 9C:
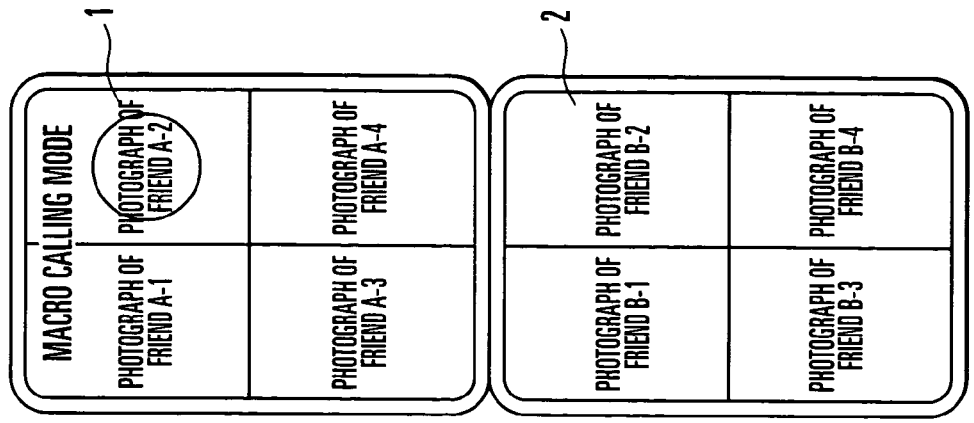

As the third process, when the home telephone number of friend A-2 is to be called, a line model "○" is input in area A-2 of the liquid crystal unit 1, as shown in FIG. 9C. When the cell phone number of friend B-3 is to be called, a line model "Δ" is input in area B-3 of the liquid crystal unit 2.

Figure 9E:
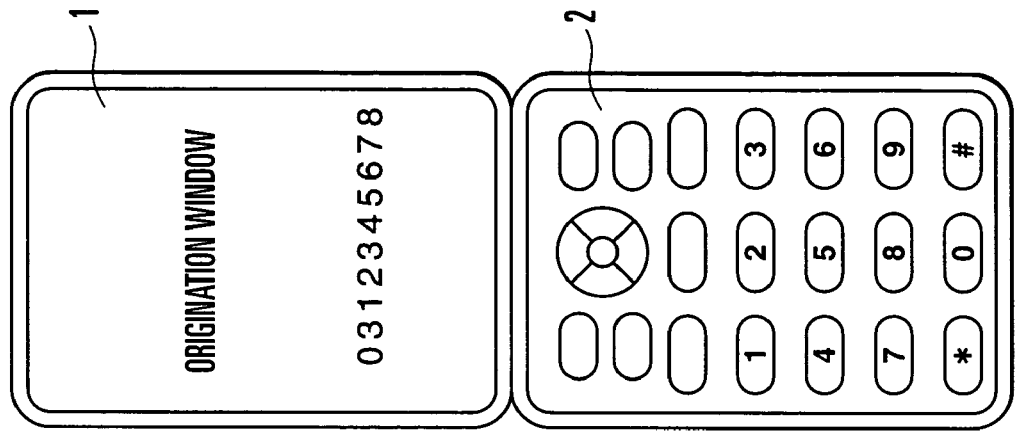
Figure 9D:
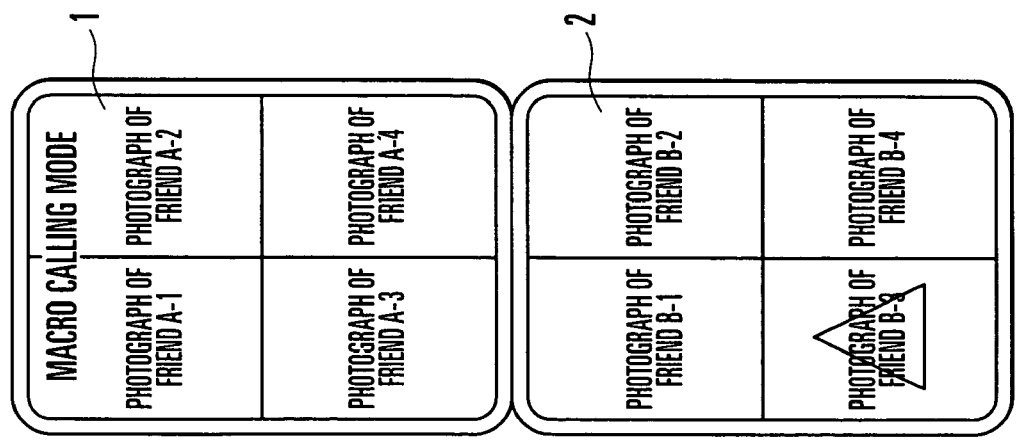

As the fourth process, as shown in FIG. 9E, the macro calling mode ends after the origination process, changing to the normal mode (step S29).

Second Embodiment

The second embodiment will be described.

The first embodiment has described an operation limited to a case in which input of line model information is one corner. In the second embodiment, a plurality of corners or pieces of line model information are permitted, and a more friendly user interface can be provided. The basic operation method is the same as that in the first embodiment. However, line model information input operation must be defined including the input start timing of line model information because the cell phone cannot automatically recognize the input completion timing of line model information.

The second embodiment adopts the following two operation methods.

As the first operation method, pieces of line model information for a plurality of corners are input by performing, at the end of inputting line model information, the same operation as that at the start of inputting line model information.

Figure 10:
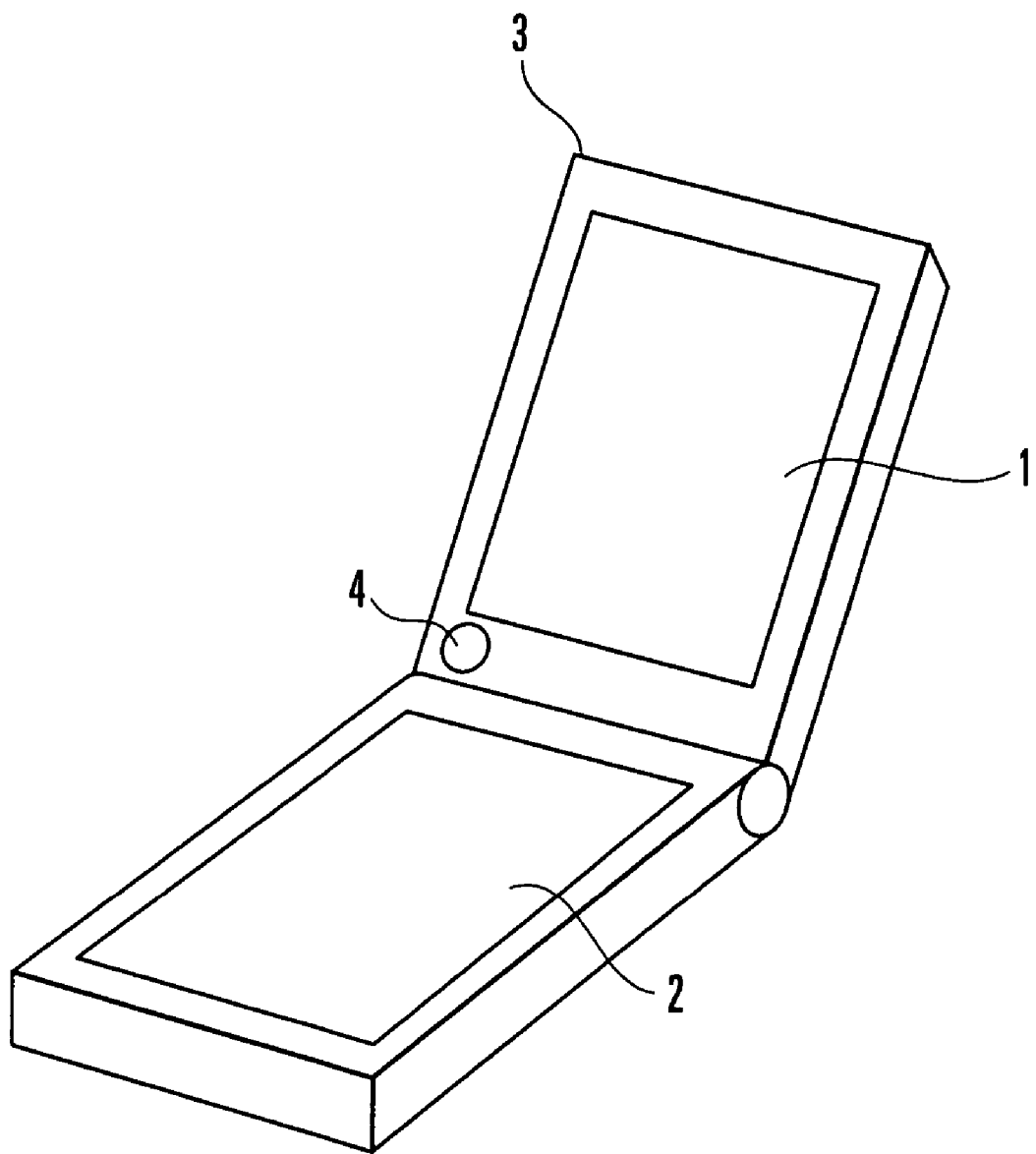
FIG. 10 is a view showing an example of the structure of a mobile communication terminal apparatus in the second embodiment according to the present invention.

As the second operation method, as shown in FIG. 10, a hard key is attached to a cell phone. While the attached hard key is pressed, line model information is kept input, thereby inputting pieces of line model information for a plurality of corners.

Figure 11:
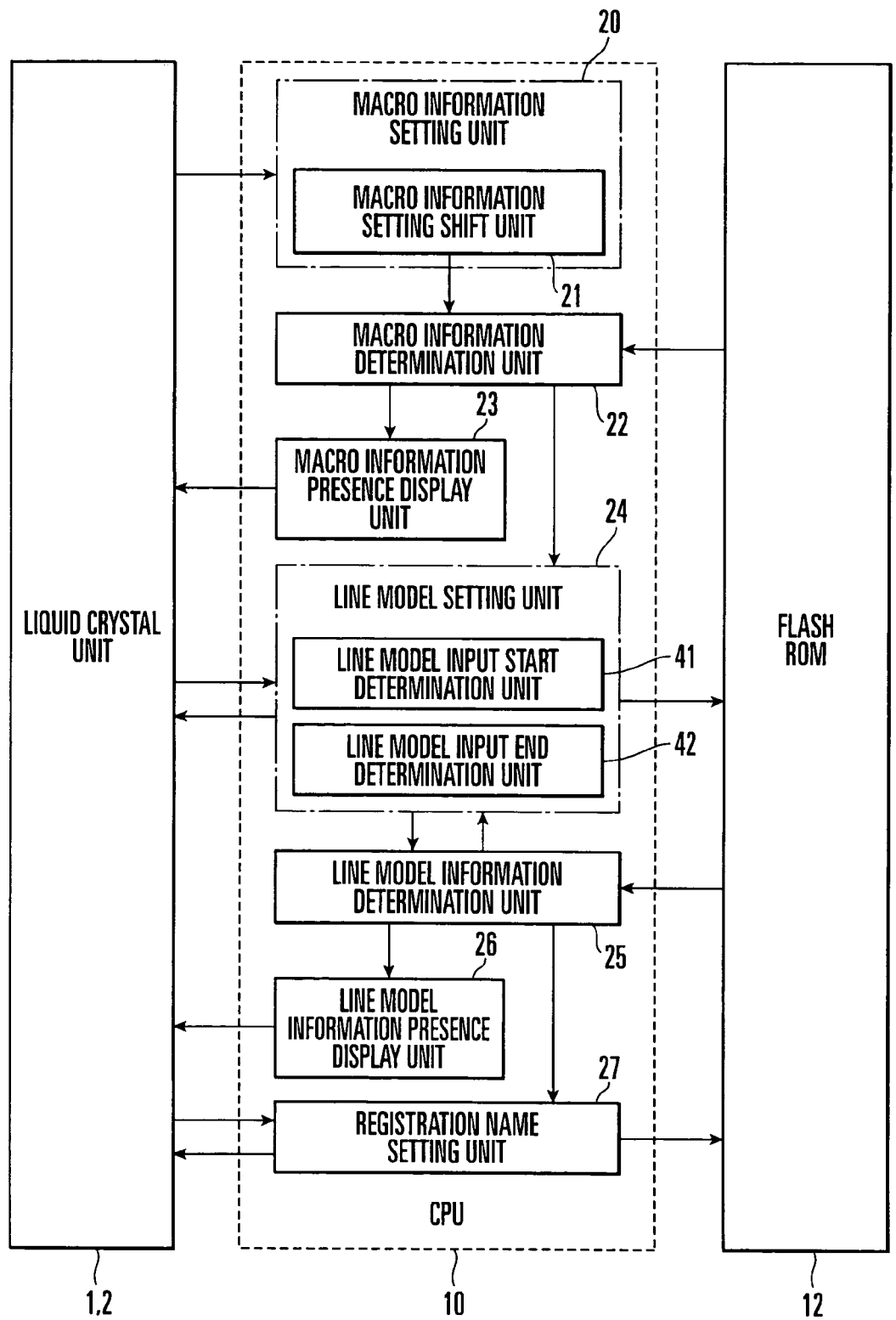
FIG. 11 is a block diagram showing functional units implemented by a CPU.

In either method, as shown in FIG. 11, a line model setting unit 24 implemented by a CPU 10 requires a line model input start determination unit 41 which determines the start of inputting line model information from liquid crystal units 1 and 2, and a line model input end determination unit 42 which determines the end of inputting line model information.

The first operation method is almost the same as the operation method described in the first embodiment. By touching the upper portion of the liquid crystal unit 2 with the stylus (or finger) even at the end of inputting line model information, the cell phone can detect the end of inputting line model information. That is, the line model input start determination unit 41 determines the start of inputting line model information when a predetermined operation on the liquid crystal unit 2 is detected. The line model input end determination unit 42 determines the end of inputting line model information when the same operation as that at the start of input is detected again.

According to the second operation method, the hard key shown in FIG. 10 is pressed after command input in macro recording. The line model input start determination unit 41 determines that command input ends and the cell phone changes to a line model information input state. While the hard key is pressed, line model information is input. Upon the completion of inputting the line model information, the hard key is released. The line model input end determination unit 42 determines that input of the line model information ends.

Note that the hard key position shown in FIG. 10 is merely an example, and the position is not particularly limited to this.

The above-described embodiments are preferred embodiments of the present invention. The present invention can be variously changed and modified without departing from the spirit and scope of the invention.

For example, the above embodiments have described a cell phone, but the present invention can be applied to any communication device as far as the device is an information communication terminal apparatus such as a PDA having a liquid crystal unit. A mobile communication terminal apparatus in the embodiments can also be constructed by executing the process operations shown in FIGS. 4 and 5 as programs in an information communication terminal apparatus having a liquid crystal unit. The liquid crystal unit may be replaced with another panel used for a predetermined operation and image display.

As has been described above, in the above embodiments, macro information which executes a series of processes is set using the liquid crystal units 1 and 2. Line model information input from the liquid crystal units 1 and 2 is set for the set macro information. The macro information is registered in the flash ROM 12 together with the line model information. The line model information registered in the flash ROM 12 is input from the liquid crystal units 1 and 2. In response to this, the macro information corresponding to the line model information is called from the flash ROM 12, and a series of processes set in the macro information are executed. A plurality of functions are successively executed using the line model information which is a simple input pattern, thus providing a user-friendly operation method.

What is claimed is:

1. A cell phone comprising:
a first liquid crystal unit and a second liquid crystal unit which are both usable commonly for a set of one or more predetermined operations and for an image display function, of which said first liquid crystal unit being used mainly for displaying a window associated with data referencing and said second liquid crystal unit being used mainly for displaying a window associated with a data inputting operation;
a storage unit for storing various information'
a macro information setting means which, when a predetermined operation for initiating a macro setting mode is performed from said second liquid crystal unit, is shifted to the macro setting mode to set a macro information for accomplishing a series of operations based on information input from at least one of said first liquid crystal unit and said second liquid crystal unit, said macro information setting means being controlled so that, even if said information input from said at least one of said first and second liquid crystal units in the course of setting said macro information, is information for executing an origination process, said at least one of said first and second liquid crystal units does not undergo any process but a window transition without performing an actual origination process, and the information input from said at least one of said first and second liquid crystal units under the window transition is registered as macro information;
a line model setting means which, when a predetermined operation for initiating a line model setting mode is performed from said second liquid crystal unit, is shifted to the line model setting mode to set, to macro information set by said macro information setting means, linear line model information input from said at least one of said first and second liquid crystal units and to then associate the thus set line model information with said macro information and store the resultant information in said storage unit;
a macro information reading means which, when a predetermined operation for initiating a macro calling mode is performed from said second liquid crystal unit, is shifted to the macro calling mode to read out, from said storage unit, said macro information associated with said line model information input from said at least one of said first and second liquid crystal units; and
a macro processing means for executing a series of operations of macro information read out by said macro information reading means.

2. The cell phone according to claim 1, wherein:
said line model information includes line model shape information representing a shape of a line model which is input from said at least one of said first and second liquid crystal units, and line model position information representing a position of the line model which is input from said at least one of said first and second liquid crystal units; and
when shifted to the line model setting mode, said line model setting means functions to display windows of both of said fist and second liquid crystal units each as an input window for said line model information and to handle the position of said line model input from said at least one of said first and second liquid crystal units as said line model position information.

3. the cell phone according to claim 2, further comprising:
a operation key which, in the line model setting mode, causes the cell phone to shift to a state of inputting said line model information, wherein:
said line model shape information comprises at least one of first shape information that forms the shape of said line model with a single continuous line segment contacting said input window and second shape information that forms the shape of said line model with a plurality of discrete line segments contacting said input window; and
said line model setting means determines whether said line model shape information is said first shape information or said second shape information on the basis of the shape of said line model input from said at least one of said first and second liquid crystal units when said operation key is under depression.

4. A non-transitory computer-readable recording medium for storing therein a program, said program allowing a control unit of a cell phone which includes in addition to said control unit a first liquid crystal unit and a second liquid crystal unit that are both usable commonly for a set of one or more predetermined operations and for an image display function, and a storage unit to execute:
a macro information setting process which, when a predetermined operation for initiating a macro setting mode is performed from said second liquid crystal unit, is shifted to a macro setting mode to set to said storage unit a macro information for accomplishing a series of operations based on information input from at least one of said first liquid crystal unit and said second liquid crystal unit, said macro information setting process being controlled so that, even if said information input from said at least one of said first and second liquid crystal units in the course of setting said macro information, is information for executing an origination process, said at least one of said first and second liquid crystal units does not undergo any process by a window transition without performing an actual origination process, and the information input from said at least one of said first and second liquid crystal units under the window transition is registered as macro information;
a line model setting process which, when a predetermined operation for initiating a lien model setting mode is performed from said second liquid crystal unit, is shifted to a line model setting mode to set, to macro information set in said macro information setting process, linear line model information input from said at least one of said first and second liquid crystal units and to then associate the thus set lien model information with said macro information and store the resultant information in said storage unit;

a macro information reading process which, when a predetermined operation for initiating a macro calling mode is performed from said second liquid crystal unit, is shifted to the macro calling mode to read out, from said storage unit, said macro information associated with said line model information input from said at least one of said first and second liquid crystal units; and a macro processing process for executing a series of operations of macro information read out in said macro information reading process.

5. The non-transitory recording medium according to claim 4, wherein:

said line model information includes line model shape information representing a shape of a line model which is input from said at least one of said first and second liquid crystal units, and line model position information representing a position of a line model which is input from said at least one of said first and second liquid crystal units; and said line model setting process comprises a process of displaying windows of both of said first and second liquid crystal units each as an input window for said line model information and a process of handling the position of said line model input from said at least one of said first and second liquid crystal units as the position information of said line model, when the cell phone is shifted to the line model setting mode.

6. The non-transitory recording medium according to claim 5, wherein:

said cell phone further has an operation key which, in said line model setting mode, causes the cell phone to shift to a state of inputting said line model information;

said line model shape information comprises at least one of first shape information for forming the shape of said line model with a single continuous line segment contacting said input window and second shape information for forming the shape of said line model with a plurality of discrete line segments contacting said input window; and said line model setting step comprises a step of determining whether said line model shape information is said first shape information or said second shape information on the bases of the shape of said line model input from said at least one of said first and second liquid crystal units when said operation key is under depression.

7. A method for controlling a cell phone, comprising a first liquid crystal unit and a second liquid crystal unit which are both useable commonly for a set of one or more predetermined operations and for an image display function, of which said first liquid crystal unit being used mainly for displaying a window associated with data referencing and said second liquid crystal unit being used mainly for displaying a window associated with a data inputting operation, and a storage unit;

a macro information setting step which, when a predetermined operation for initiating a macro setting mode is performed from said second liquid crystal unit, is shifted to a macro setting mode to set said storage unit a macro information for accomplishing a series of operations based on information input from at least one of said first liquid crystal unit and second liquid crystal unit, said macro information setting step being controlled so that, even is said information input from said at least one of said first and second liquid crystal units in the course of setting said macro information, is information for executing an origination process, said at least one of said first and second liquid crystal units does not undergo any process but a window transition without performing an actual origination process, and the information input from said at least one of said first and second liquid crystal units under the window transition is registered as macro information;

a line model setting step which, when a predetermined operation for initiating a line model setting mode is performed from said second liquid crystal unit, is shifted to a line model setting mode to set, to macro information set in said macro information setting step, linear line model information input form said at least one of said first and second liquid crystal units and to then associate the thus set line model information with said macro information and store the resultant information in said storage unit;

a macro information reading step which, when a predetermined operation for initiating a macro calling mode is performed from said second liquid crystal unit, is shifted to the macro calling mode to read out, from said storage unit, said macro information associated with said line model information input from said at least one of said first and second liquid crystal units; and a macro processing step of executing a series of operations of macro information read out in said macro information reading step.

8. The method according to claim 7, wherein:

said line model information includes line model shape information representing a shape of a line model which is input from said at least one of said first and second liquid crystal units, and line model position information representing a position of a line model which is input from said at lest one of said first and second liquid crystal units; and said line model setting step comprises a step of displaying windows of both of said first and second liquid crystal units each as an input window for said line model information and a step of handling the position of said line model input from said at least one of said first and second liquid crystal units as the position information of said line model, when the cell phone is shifted to the line model setting mode.

9. The method according to claim 8, wherein:

said cell phone further has an operation key which, in the line model setting mode, causes the cell phone to shift to a state of inputting said line model information;

said line model shape information comprises at least one of first shape information for forming the shape of said line model with a single continuous line segment contacting said input window and second shape information for forming the shape of said line model with a plurality of discrete line segments contacting said input window; and said line model setting step comprises a step of determining whether said line model shape information is said first shape information or said second shape information on the basis of the shape of said line model input from said at least one of said first and second liquid crystal display units when said operation key is under depression.

* * * * *